(12) United States Patent
Mawhinney et al.

(10) Patent No.: US 11,370,619 B2
(45) Date of Patent: Jun. 28, 2022

(54) MATERIAL PROCESSING APPARATUS WITH ACCESS STATE CONVEYOR

(71) Applicant: Terex GB Limited, Dungannon (GB)

(72) Inventors: Mark Mawhinney, Dungannon (GB); Stephen Greaves, Dungannon (GB)

(*) Notice: Subject to any disclaimer, the term of this patent is extended or adjusted under 35 U.S.C. 154(b) by 82 days.

(21) Appl. No.: 16/912,240

(22) Filed: Jun. 25, 2020

(65) Prior Publication Data
US 2021/0403244 A1 Dec. 30, 2021
US 2022/0112033 A9 Apr. 14, 2022

(30) Foreign Application Priority Data

Jun. 27, 2019 (GB) ..................................... 1909287

(51) Int. Cl.
*B65G 41/00* (2006.01)
*B65G 21/12* (2006.01)

(52) U.S. Cl.
CPC ......... *B65G 41/005* (2013.01); *B65G 41/007* (2013.01); *B65G 21/12* (2013.01)

(58) Field of Classification Search
CPC .... B65G 41/005; B65G 23/00; B65G 41/007; B65G 41/002; B65G 21/12
USPC ....................................................... 198/632
See application file for complete search history.

(56) References Cited

U.S. PATENT DOCUMENTS

| | | | | |
|---|---|---|---|---|
| 2,834,487 A * | 5/1958 | Gaddis | ...................... | B60P 1/36 414/523 |
| 4,011,937 A | 3/1977 | Brandtjen | | |
| 5,360,097 A * | 11/1994 | Hibbs | .................. | B65G 41/005 198/313 |
| 5,820,043 A | 10/1998 | Loppoli | | |
| 7,347,311 B2 * | 3/2008 | Rudge | .................... | B65G 21/14 198/313 |
| 8,696,296 B2 * | 4/2014 | Claussen | .............. | B65G 41/005 414/503 |
| 8,820,510 B2 * | 9/2014 | Forster | .................. | E01C 23/088 198/318 |
| 8,919,526 B2 * | 12/2014 | Fickeisen | ............... | B65G 41/00 198/318 |
| 9,844,185 B2 * | 12/2017 | Renyer | ..................... | B60P 1/00 |
| 10,696,118 B2 * | 6/2020 | Bratton | ................ | B65G 41/001 |

(Continued)

FOREIGN PATENT DOCUMENTS

DE 29515630 U1 2/1996
GA 2121537 A1 10/1994
(Continued)

OTHER PUBLICATIONS

UK Search Report, dated Dec. 3, 2019, for GB patent application GB1909287.3, a foreign counterpart.
(Continued)

*Primary Examiner* — Mark A Deuble
(74) *Attorney, Agent, or Firm* — Warner Norcross + Judd LLP (57) ABSTRACT

A material processing apparatus has a discharge conveyor that is coupled to the body of the apparatus so that it can pivot with respect to the body and be raised vertically with respect to the body. The coupling mechanism allows the pivoting and lifting of the conveyor to be performed by the same actuators. The discharge conveyor can be raised into an access state in which a transfer conveyor can be removed from the body.

20 Claims, 4 Drawing Sheets

(56) References Cited

U.S. PATENT DOCUMENTS

| | | |
|---|---|---|
| 2006/0237346 A1 | 10/2006 | Fridman et al. |
| 2014/0084665 A1* | 3/2014 | Motz ..................... E01C 23/127 299/39.2 |
| 2018/0334332 A1 | 11/2018 | Eberts |

FOREIGN PATENT DOCUMENTS

| | | | | |
|---|---|---|---|---|
| GB | 2585071 A | * | 12/2020 | ........... B65G 41/005 |
| JP | S5992811 A | | 5/1984 | |

OTHER PUBLICATIONS

European Search Report, dated Oct. 27, 2020, for EP patent application EP20182699.
UK Examination Report of GB 1909287.3, the parent application of U.S. Appl. No. 16/912,240.

* cited by examiner

MATERIAL PROCESSING APPARATUS WITH ACCESS STATE CONVEYOR

FIELD OF THE INVENTION

This invention relates to material processing apparatus.

BACKGROUND TO THE INVENTION

Material processing apparatus commonly include a discharge conveyor for delivering processed material to a stockpile or to another apparatus. Usually, the processed material is provided to the discharge conveyor by another part of the material processing apparatus, typically another conveyor but alternatively by a material processing unit.

The discharge conveyor can impede access to other parts of the material processing apparatus, which can be problematic when a part needs serviced or replaced. In some cases it is necessary to remove the discharge conveyor in order to gain access to the relevant part, or to allow the part to be removed. In particular, in cases where the discharge conveyor is fed by a transfer conveyor, it may be required to remove the transfer conveyor from the material processing apparatus for maintenance or replacement, but this is prevented by the presence of the discharge conveyor. In such circumstances it is common practice to remove the discharge conveyor from the apparatus, and then to remove the transfer conveyor. However, this is an awkward and time consuming procedure.

It would be desirable to mitigate the problem outlined above.

SUMMARY OF THE INVENTION

The invention provides a material processing apparatus comprising:
- a body;
- a first conveyor having a first end and a second end;
- a coupling mechanism coupling said conveyor to said body with said first end being proximal to the body and said second end being distal to the body, said coupling mechanism being configurable to allow said first conveyor to pivot with respect to said body about a transverse axis, and being configurable to allow said first end of said first conveyor to be moved with respect to the body; and
- at least one actuator for moving said first conveyor with respect to said body, wherein said at least one actuator is operable to pivot said first conveyor about said transverse axis, and to move said first end of the first conveyor with respect to the body.

Preferably, said coupling mechanism is configurable to allow said first end of said conveyor to be raised and lowered with respect to the body, and wherein said at least one actuator is operable to raise and lower said first end of the first conveyor with respect to the body.

Preferably, said at least one actuator is operable to move said first conveyor into and out of an access state in which said first end adopts a relatively raised position with respect to said body.

Preferably, said coupling mechanism is configurable to allow linear movement of said first conveyor with respect to said body. Said linear movement may be in a substantially vertical direction, or in a direction towards and away from a ground surface.

In preferred embodiments, said body includes a second conveyor having first and second ends, and wherein, at least in a working state of said first conveyor, said second end of said second conveyor is located adjacent said first end of said first conveyor, and wherein said at least one actuator is operable to move said first end of said first conveyor away from said second end of said second conveyor. The second conveyor is typically removable from said body, and wherein said at least one actuator is operable to move said first conveyor into and out of an access state in which said first end of said first conveyor does not obstruct removal of said second conveyor from said body.

In preferred embodiments, said coupling mechanism comprises a pivotable coupling comprising at least one first coupling part provided on the discharge conveyor, and at least one corresponding second coupling part provided on the body of the apparatus, and wherein said pivotable coupling is configurable so that said first and second coupling parts are releasably engagable with each other.

The first coupling part may comprise a pin bearing and the second coupling part comprises a bearing seat for receiving the pin bearing, and wherein the bearing seat has an open mouth to allow the bearing pin to enter and leave the seat in a direction perpendicular to the pivot axis. The bearing seat may be U-shaped or hook shaped. Preferably said bearing seat is oriented so that the mouth faces upwards.

Preferably, said at least one actuator is coupled between said body and said first conveyor.

Preferably, said at least one actuator comprises at least one linear actuator. The, or each, linear actuator may have a first end pivotably coupled to said body, and a second end pivotably coupled to said first conveyor. Said first end of said at least one linear actuator is preferably coupled to said body at a location above the transverse axis about which said first conveyor is pivotable.

In preferred embodiments, said at least one actuator is operable either to pivot said first conveyor about said transverse axis, or to move said first end of the conveyor with respect to the body depending on an angle of inclination of the first conveyor with respect to the body. Said at least one actuator may be operable to pivot said first conveyor through a range of angles of inclination, and is operable to move said first end of the conveyor with respect to the body when said first conveyor is at a designated angle of inclination, preferably a steepest angle of inclination.

Advantageously, the same actuator(s) effect both the pivoting movement of the first conveyor and the movement of said first end of the conveyor with respect to the body.

In preferred embodiments, the coupling mechanism further includes guide means for facilitating linear movement of the first end of the first conveyor with respect to the body of the apparatus. The guide means may comprise a linear movement mechanism comprising a linear track and a corresponding runner for running along the track, and wherein, preferably, the track is provided on the body of the apparatus, and the runner is provided on the first conveyor. The coupling mechanism preferably includes a retaining device operable between a retaining state in which the runner is retained on the track, and a non-retaining state in which the runner is not retained on the track.

The preferred coupling mechanism is configured so that, when the respective first and second coupling parts are engaged, the runner is either not on the track, or is removable from the track, to allow pivoting movement of the first conveyor. The preferred coupling mechanism is configured such that, when the first conveyor is at a designated angle of inclination, the runner is located on the track.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Referring now to the drawings, there is shown, generally indicated as 10, a material processing apparatus. Only those parts of the apparatus that are helpful for understanding the present invention are shown. In general, the apparatus 10 may be configured to perform any one or more of a plurality of processes, such as feeding, screening, separating, crushing, recycling, shredding, demolition and/or washing, on one or more types of aggregate or other material, for example rocks, stones, gravel, sand and/or soil, or any other material, especially but not exclusively, material that is quarried, mined, excavated or requires recycling. To this end, the apparatus typically includes one or more material processing unit 12 configured to perform one or more of the foregoing processes. In the illustrated embodiment, the material processing unit 12 is a material shredder, although it will be understood that the invention is not limited to shredders and may be employed with other types of material processing unit.

The main body of the apparatus 10 comprises a chassis 13 that carries the (or each) material processing unit 12. The chassis 13 may also carry one or more other components that facilitate use of the processing unit 12, usually including a feed unit 14 for delivering material to the material processing unit 12. The feed unit 14 may take any conventional form, typically comprising a hopper 14A and optionally a feed conveyor and/or a screen (not shown). The chassis 13 has a longitudinal axis extending from end 17 to end 19, which may also be said to correspond to the front-to-rear direction of the chassis 13, and of the apparatus 10. The material processing unit 12 is arranged to process material in a forward direction (left to right as viewed in FIG. 1) that is parallel with the longitudinal axis of the chassis 13.

The powered components of the apparatus 10, including the material processing unit 12, are typically powered by one or more hydraulic system comprising motor(s), actuator(s) and/or other component as required. It will be understood that alternative power systems, e.g. electrical or pneumatic systems, may be used, and so the motor(s) and other components may be powered by alternative means. An electrical system may also be provided as would be apparent to a skilled person. In any event the apparatus 10 includes a power plant 15 comprising means for generating the requisite power (e.g. including electrical, hydraulic, motive and/or pneumatic power as applicable) for the apparatus 10. The power plant 15 may take any convenient conventional form, e.g. comprising any one or more of an engine, compressor and/or batteries.

In typical embodiments, the apparatus 10 is mobile and comprises one or more wheels and/or tracks 11 mounted on the chassis 13. However, in other embodiments (not illustrated), the apparatus 10 may be semi-mobile, for example comprising fixed or adjustable legs (and usually no wheels or tracks). The apparatus 10 may be self-propelled and to this end the power plant 15 may comprise an internal combustion engine and associated drive system (not shown). In such cases, the internal combustion engine conveniently generates power for the hydraulic system(s), e.g. by operating the hydraulic pump(s) (not shown), and may also power an electric generator (not shown) for the electrical system.

The apparatus 10 includes a discharge conveyor 30 for discharging processed material from the apparatus 10. The discharge conveyor 30 has a first, or feed, end 32 and a second, or discharge, end 34 and is operable to convey material from the first end 32 to the second end 34. In use, the discharge end 34 is positioned over a location where the material is to be deposited, for example a stockpile, a container, or another material processing apparatus (not illustrated). In some embodiments, therefore, the discharge conveyor 30 may comprise a stockpiling conveyor. The discharge conveyor 30 projects from the main body of the apparatus 10, with the feed end 32 being proximal to the main body and the discharge end 34 being distal to the main body. The main body of the apparatus 10 may be said to include chassis 13, the transfer conveyor 40, the processing unit 12 and power plant 15 in this example, although its composition varies depending on the embodiment.

The apparatus 10 is configured to feed material to the discharge conveyor 30. In preferred embodiments, material is fed to the discharge conveyor 30 by a transfer conveyor 40. The transfer conveyor 40 has first and second ends 42, 44. When the discharge conveyor 30 is in a working mode, the second end 44 of the transfer conveyor 40 is positioned adjacent, and preferably over, the feed end 32 of the discharge conveyor 30 in order to deposit material onto the discharge conveyor 30. Typically, the transfer conveyor 40 runs along, or parallel with, the longitudinal axis of the apparatus 10, and is operable to convey material in a longitudinal direction. In the illustrated embodiment, the transfer conveyor 40 conveys material in the forward direction (left-to-right as viewed in the drawings). In FIGS. 1 to 6, only the end 44 of conveyor 40 is visible, while FIG. 7 shows the transfer conveyor removed from the apparatus 10.

The transfer conveyor 40 is typically located below an outlet (not visible) of the processing unit 12 in order to receive material from the processing unit 12, the received material then being conveyed to the discharge conveyor 30. The transfer conveyor 40 may be arranged to receive material from one or more other components of the apparatus 10 depending on the composition and configuration of the apparatus 10. In alternative embodiments (not illustrated), material may be fed to the discharge conveyor 30 from the material processing unit 12 (e.g. via a chute) and/or from one or more other components of the apparatus 10 depending on the composition and configuration of the apparatus 10. In such cases, the transfer conveyor 40 may be omitted or bypassed.

Figure 1:
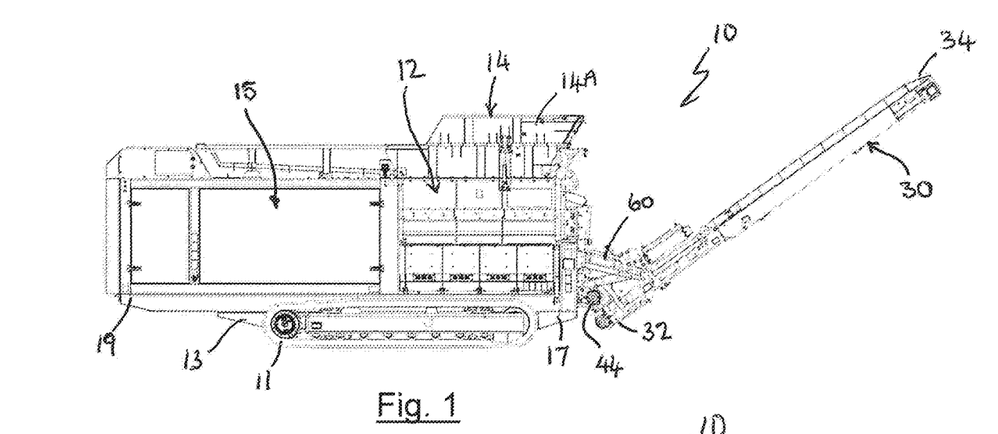
FIG. 1 is a side view of a material processing apparatus embodying the invention, the apparatus including a discharge conveyor shown in a working state and disposed at a first angle of inclination.
Figure 2:
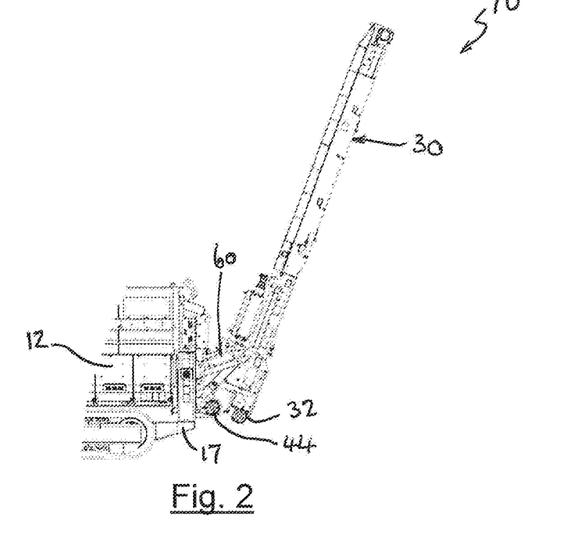
FIG. 2 is a side view of the end of the apparatus of FIG. 1 with the discharge conveyor shown in a transport state and disposed at a second angle of inclination.

In typical embodiments, the discharge conveyor 30 is coupled to, and projects from, the end 17 of the apparatus 10. In alternative embodiments, the discharge conveyor 30 may be coupled to the apparatus 10 at any suitable location, e.g. at the other end 19 or at a lateral side of the apparatus 10. Typically, the discharge conveyor 30 is coupled to the apparatus 10 at, or adjacent, its feed end 32. In preferred embodiments, the discharge conveyor 30 is coupled to the apparatus 10 by a coupling mechanism configured to pivot the discharge conveyor 30 about a transverse axis that is substantially horizontal in use, i.e. an axis that is substantially parallel with the ground surface (not shown) on which the apparatus 10 is located, and which typically runs transverse to the longitudinal axis of the apparatus 10, and/or typically transverse to the direction in which the conveyor 30 conveys material in use. The pivot axis is typically located substantially at or adjacent the feed end 32 of the discharge conveyor 30 so that the discharge end 34 can be raised and lowered relative to the ground surface. Hence, in a working state of the apparatus 10, the discharge conveyor 30 can be pivoted with respect to the chassis 13 to raise or lower its discharge end 34 in order to suit the discharge location, e.g. to suit the size of a stockpile or the height of another material processing apparatus (not shown). By way of example, FIG. 1 shows the discharge conveyor 30 disposed at a first, relatively shallow, angle of inclination with respect to the chassis 13, while FIG. 2 shows the discharge conveyor 30 disposed at a second, relatively steep, angle of inclination with respect to the chassis 13. In this example, it is assumed that FIG. 1 illustrates the working state of the apparatus 10, while FIG. 2 illustrates a transport state. In the working state, the discharge conveyor 30 may typically adopt any one of a plurality of angles of inclination with respect to the chassis 13, although only one is illustrated. In the transport state, the angle of inclination of the conveyor 30 is steeper than in the working state, preferably being such that the conveyor 30 is vertical or as close to vertical as possible, in order to minimize the length of the apparatus 10 for transport. In the transport state, the feed end 32 of the discharge conveyor 30 is typically located adjacent the end 44 of the transfer conveyor 40 but, unlike when in the working state, it may not be positioned to receive material from the end 44 of the transfer conveyor 40.

In both the transport and working states, part of the discharge conveyor 30, including the feed end 32, is located adjacent the body of the apparatus 10, in particular adjacent the end 17 in the preferred embodiment. As such, the discharge conveyor 30 can inhibit access to other parts of the apparatus 10 and/or can prevent other parts of the apparatus 10 from being removed. This can be problematic when such parts need to be serviced, repaired or replaced. In particular, it is possible to remove the transfer conveyor 40 from the apparatus 10 by moving it in the longitudinal direction (left to right as illustrated) out of the end 17 of the apparatus 10. However, when the discharge conveyor 30 is in the transport and working states, it obstructs the removal path of the transfer conveyor 40, preventing it from being removed, as can best be appreciated from FIGS. 3 and 4. One solution to this problem is to decouple the discharge conveyor 30 and to remove it from the apparatus 10. However, this is awkward and time consuming.

Figure 4:
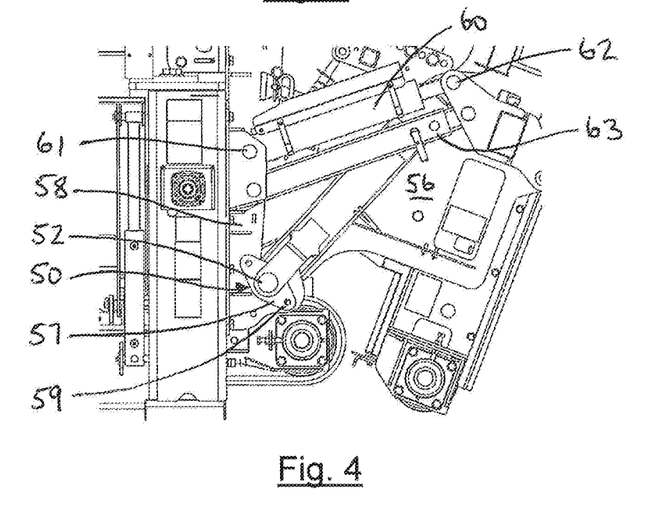
FIG. 4 is a side view of the coupling between the apparatus and the discharge conveyor with the discharge conveyor in the state shown in FIG. 2.
Figure 5:
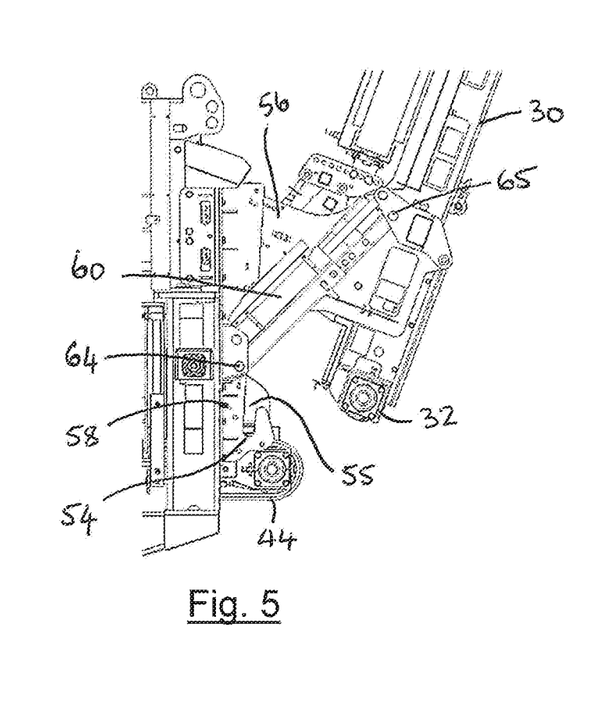
FIG. 5 is a side view of the end of the apparatus of FIG. 1 with the discharge conveyor shown in an access state.
Figure 6:
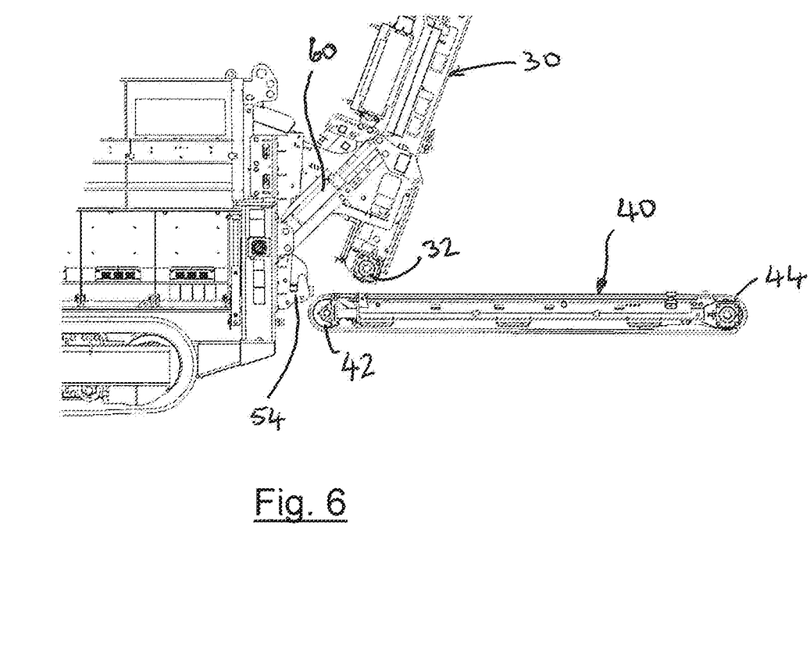
FIG. 6 is a side view of the apparatus of FIG. 1 with the discharge conveyor in the access state and a transfer conveyor removed.
Figure 7A:
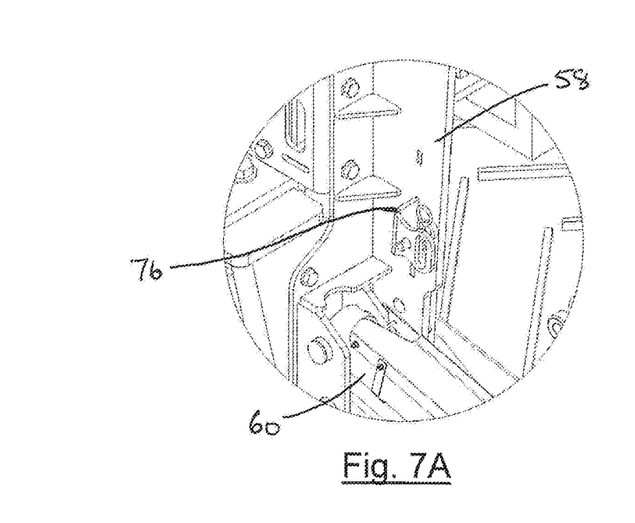
FIG. 7A is a perspective view of the coupling between the apparatus and the discharge conveyor showing a retaining device in a non-retaining state.
Figure 7B:
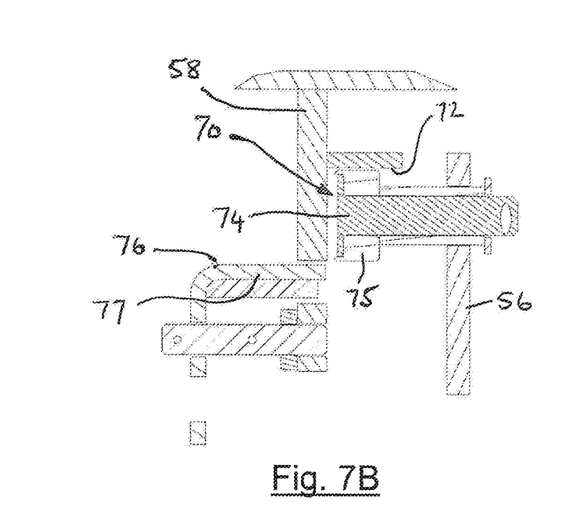
FIG. 7B is a sectioned plan view of the coupling between the apparatus and the discharge conveyor showing the retaining device in the non-retaining state.
Figure 8A:
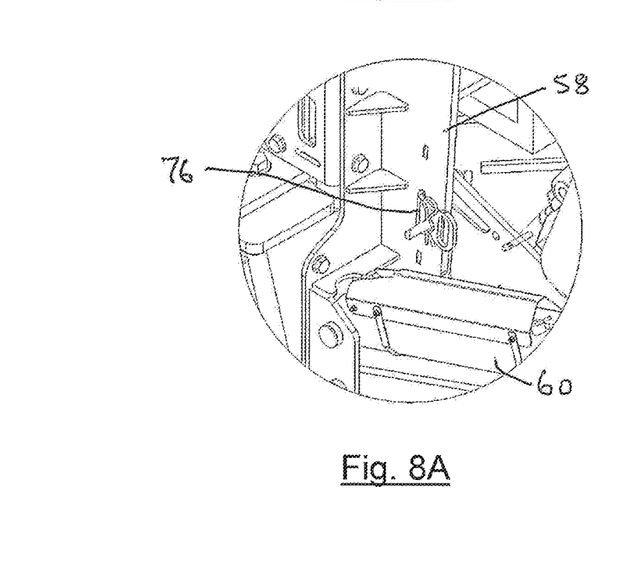
FIG. 8A is a perspective view of the coupling between the apparatus and the discharge conveyor showing the retaining device in a retaining state.
Figure 8B:
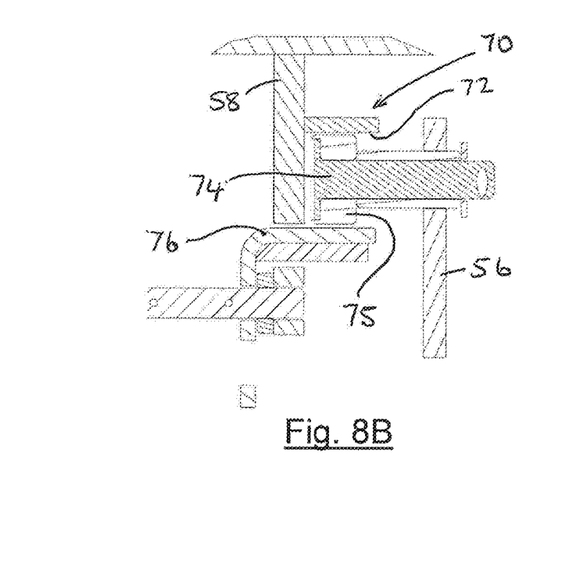
FIG. 8B is a sectioned plan view of the coupling between the apparatus and the discharge conveyor showing the retaining device in the retaining state.

To mitigate these problems, the discharge conveyor 30 is movable into and out of an access state (FIGS. 5 and 6). In preferred embodiments, the discharge conveyor 30 is movable upwards and downwards with respect to the chassis 13 to allow it to move into and out of the access state. Typically, the movement is in a substantially vertical direction, i.e. perpendicular to the ground surface. Preferably, the discharge conveyor 30 is movable linearly into and out of the access state. Advantageously, the whole of the discharge conveyor 30 moves linearly and/or upwards/downwards, as applicable, when moving into and out of the access state. In preferred embodiments, the discharge conveyor 30 is movable between the working state and the access state, and/or between the transport state and the access state. Preferably, the discharge conveyor 30 moves upwards, or away from the chassis 13, when moving into the access state, and downwards, or towards the chassis 13, when moving out of the access state. For example, in the illustrated embodiment, the discharge conveyor 30 is movable upwards from the transport state (FIGS. 2 and 4) into the access state (FIGS. 5 and 6), and is movable downwards from the access state into the transport state. In such embodiments, the discharge conveyor 30 is pivotable between the transport state and the working state, as described above. In alternative embodiments there may be no dedicated transport state in which case the discharge conveyor 30 may be movable upwards from the working state into the access state, and movable downwards from the access state into the transport state.

As can be seen from FIGS. 5 and 6, when in the access state, the discharge conveyor 30 (and in particular the feed end 32) adopts a relatively raised position in comparison with its position in the working and transport states. As a result, the discharge conveyor 30 does not obstruct removal of the transfer conveyor 40. Moreover, the displacement of the discharge conveyor 30 in the access state relative to the working or transport state allows better access to other parts of the apparatus 10 at the end 17.

The preferred coupling mechanism between the discharge conveyor 30 and the body of the apparatus 10 is now described with reference in particular to FIGS. 3, 4 and 5. The coupling mechanism comprises a pivotable coupling 50 that allows the discharge conveyor 30 to pivot with respect to the body, or chassis 13, about a transverse axis in order to change the angle of inclination of the conveyor as described above. The pivotable coupling 50 comprises at least one first coupling part 52 provided on the discharge conveyor 30, and at least one corresponding second coupling part 54 provided on the body of the apparatus 10. The corresponding first and second coupling parts 52, 54 are releasably engagable with each other. When engaged, the corresponding first and second coupling parts 52, 54 are pivotable with respect to each other to enable the pivoting movement of the conveyor 30. In preferred embodiments, the first coupling part 52 comprises a pin bearing and the second coupling part 54 comprises a bearing seat (as can best be seen in FIG. 5) for receiving the pin bearing. The bearing seat 54 has an open mouth 55 to allow the bearing pin 52 to enter and leave the seat 54 in a direction perpendicular to the pivot axis. For example, the bearing seat 54 may be U-shaped or hook shaped. Preferably, the bearing seat 54 is oriented so that the mouth 55 faces upwards, allowing the bearing pin 52 to be lifted upwards out of the seat 54, and to be lowered into the seat 54. In preferred embodiments, two sets (only one set is visible) of first and second coupling parts 52, 54 are provided, the sets being transversely spaced apart, a respective set typically being located at each side of the conveyor 30. In alternative embodiments, there may be only one set of coupling parts 52, 54, or there may be more than two sets, as desired.

The, or each, first coupling part 52 may be provided on any convenient coupling structure 56 provided on the discharge conveyor 30. In the illustrated embodiment, the coupling structure 56 is fixed to a side of the conveyor 30 adjacent the feed end 32 and may for example comprise a plate.

In preferred embodiments, the, or each, second coupling part 54 is provided on a second coupling structure 58 located at end 17 of the apparatus 10. The coupling structure 58 may be provided on, e.g. fixed to or integrally formed with as is convenient, any convenient part of the body of the apparatus 10. For example the coupling structure 58 may be provided on the processing unit 12, or on the chassis 13.

The coupling mechanism further comprises at least one linear actuator 60 coupled between the discharge conveyor 30 and the main body of the apparatus 10. In particular, the, or each, actuator 60 has one end 61 pivotably coupled to the body of the apparatus 10 and the other end 62 pivotably coupled to the discharge conveyor 30. In the illustrated embodiment, two actuators 60 are provided (only one is visible), the actuators 60 being transversely spaced apart, a respective one typically being located at each side of the conveyor 30. In alternative embodiments, there may be only one actuator 60, or there may be more than two, as desired. Conveniently, each actuator 60 comprises a hydraulic ram, but any other type of extendible linear actuator may be used, e.g. a pneumatic ram or electrical linear actuator. Optionally, a respective extendable support arm 63 may be provided in parallel with each actuator 60, i.e. with one end 64 pivotably coupled to the apparatus 10 adjacent the end 61 of the actuator 60, and the other end 65 pivotably coupled to the discharge conveyor 30 adjacent the end 62 of the actuator 60.

Figure 3:
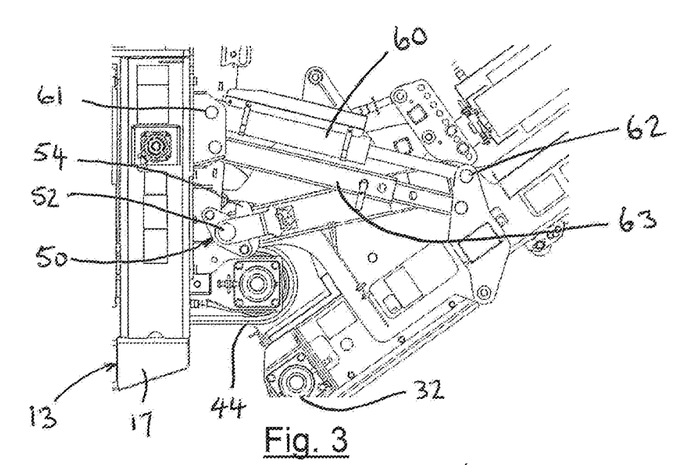
FIG. 3 is a side view of the coupling between the apparatus and the discharge conveyor with the discharge conveyor in the state shown in FIG. 1.

When the first and second coupling parts 52, 54 are inter-engaged, extension and retraction of the actuators 60 causes the discharge conveyor 30 to pivot about the pivot axis, as can be seen for example by comparison of FIGS. 3 and 4. As such, extension and retraction of the actuators 60 alters the angle of inclination of the discharge conveyor 30. When the discharge conveyor 30 is in the working mode, the first and second coupling parts 52, 54 are inter-engaged and so the angle of the conveyor 30 may be adjusted by extending or retracting the actuators 60. In embodiments where the discharge conveyor 30 can adopt a dedicated transport state, the discharge conveyor 30 can be moved into and out of the transport state by extension or retraction of the actuators 60, since the transport state may be similar to the working state except with a steeper angle of inclination.

In preferred embodiments, the configuration of the coupling mechanism is such that, when the first and second coupling parts 52, 54 are inter-engaged, retraction of the actuators 60 causes the discharge conveyor 30 to pivot upwardly, i.e. to raise the discharge end 34 with respect to the ground surface (or to increase the angle of inclination with respect to the longitudinal axis), while extension of the actuators causes the discharge conveyor 30 to pivot downwardly, i.e. to lower the discharge end 34 with respect to the ground surface (or to decrease the angle of inclination with respect to the longitudinal axis). This may be achieved by positioning the end 61 of each actuator 60 above the pivot axis with respect to the chassis 13.

Optionally, a first locking device 57 is provided to maintain the inter-engagement of the pivotable coupling parts 52, 54. When the locking device is in its locking state, the pivotable coupling parts 52, 54 are maintained in engagement and the discharge conveyor 30 is pivotable with respect to the chassis 13 as described above. When the locking device is in a non-locking state, the coupling parts 52, 54 are able to disengage from each other, in particular the bearing pin 52 is able to leave the bearing seat 54 via the mouth 55. The first locking device 57 can take any convenient form. In the illustrated embodiment, the first locking device 57 comprises one or more removable pin, bolt or other fixing 59. Respective sockets maybe provided in the coupling structures 56, 58 for receiving the, or each, fixing 59 in the locked state. For example, coupling structure 56 may comprise a formation 53, e.g. a plate, adjacent the coupling part 52, the formation 53 including socket(s) that align with corresponding socket(s) provided in the coupling structure 58 adjacent the coupling part 54. In alternative embodiments, the first locking device 57 may be omitted. Optionally, one or other or both of the coupling parts 52, 54 may be shaped to retain the coupling parts 52, 54 in engagement with each other for angles of inclination of the conveyor 30 that correspond to the working state, and optionally the transport state, but to allow the coupling parts 52, 54 to disengage when the conveyor 30 adopts a designated angle of inclination (preferably its steepest inclination with respect to the longitudinal axis). For example, this may be achieved by orienting the bearing seat 54 such that the coupling part 52 can be lifted out through the mouth 55 (e.g. by extension of the actuators 60) when the discharge conveyor 30 is at the relevant angle of inclination.

In preferred embodiments, the coupling mechanism further includes guide means for facilitating linear movement of the discharge conveyor 30 with respect to the body of the apparatus 10, in particular linear movement away from and towards the chassis 13, i.e. upwards and downwards in use. The guide means may for example comprise one or more linear slide or roller mechanism. FIGS. 7A, 7B, 8A and 8B illustrate an embodiment of a linear movement mechanism 70 that is part of the preferred coupling mechanism. The linear movement mechanism 70 comprises a linear track 72 and a corresponding runner 74 for running along the track 74. Optionally, the runner 74 comprises a roller 75. In the illustrated embodiment, the track 72 is provided on the body of the apparatus 10, conveniently on the coupling structure 58, and the runner 74 is provided on the discharge conveyor 30, conveniently on the coupling structure 56. Alternatively, the track 72 may be provided on the conveyor 30 and the runner 74 may be provided on the body. Optionally a retaining device 76 is provided that is operable between a retaining state (FIGS. 8A and 8B) in which the runner 74 is retained on the track 72, and a non-retaining state (FIGS. 7A and 7B) in which the runner 74 is not retained on the track 72 and is able to be removed from the track 72. The retaining device 76 may take any convenient form, for example comprising a plate 77 that is movable into and out of the retaining state in which it forms part of the track 72. In alternative embodiments (not illustrated) the runner 74 may be movable with respect to its supporting part (i.e. the coupling structure 56 in the illustrated example) into and out of engagement with the track 72.

In preferred embodiments, the arrangement is such that when the pivotable coupling parts 52, 55 are engaged, the runner 74 is either not on the track 72, or is removable from the track 72, to allow pivoting movement of the discharge conveyor 30 by means of the actuators 60 (e.g. in the working state and/or transport state). In the illustrated embodiment, this may be facilitated by causing the retaining device 76 to adopt the non-retaining state. When it is desired to move the discharge conveyor 30 into and out of the access state, the runner 74 is on the track 72 and, in preferred embodiments, is retained on the track 72 by causing the retaining device 76 to adopt the retaining state. Conveniently, the arrangement is such that, when the discharge conveyor 30 is at an angle of inclination from which it is movable into and out of the access state (which corresponds to the angle of inclination of the transport state in the illustrated embodiment, but more generally may be its steepest angle of inclination), the runner 74 is located on the track 72, e.g. is brought into engagement with the track 72 by the movement of the conveyor 30, or by movement of the runner 74 with respect to the conveyor 30. In preferred embodiments, in this state, the coupling parts 52, 54 can be de-coupled, as described above. Hence, the conveyor 30 is able to move linearly with respect to the body of the apparatus 10, guided by the linear movement mechanism 70, and is not constrained to pivoting movement by the pivotable coupling 50.

When the bearing pin 52 is not retained in the bearing seat 54, operation of the actuators 60 causes the linear movement of the discharge conveyor 30 with respect to the body of the apparatus 10, and so causes the discharge conveyor 30 to be moved into and out of the access state. In preferred embodiments, extension of the actuators 60 raises the discharge conveyor 30 (i.e. moves it in a direction away from the chassis 13) and retraction of the actuators 60 lowers the discharge conveyor 30 (i.e. moves it in a direction towards the chassis 13). As the discharge conveyor 30 is raised, the bearing pin 52 moves out of and away from the bearing seat 54. As the discharge conveyor 30 is lowered, the bearing pin 52 moves downwards and into the bearing seat 54.

Hence, in the working mode, with the bearing pin 52 retained in the bearing seat 54, extension and retraction of the actuators 60 causes the discharge conveyor 30 to pivot about the transverse pivot axis, which pivoting movement may include pivoting the discharge conveyor into and out of its transport state. However, when the bearing pin 52 is not retained in the bearing seat 54, extension and retraction of the actuators 60 causes the discharge conveyor 30 to be raised and lowered with respect to the body of the apparatus 10, into and out of the access state. In preferred embodiments, with the bearing pin 52 retained in the bearing seat 54, retraction of the actuators 60 pivots the discharge conveyor 30 upwardly, and when the bearing pin 52 is not retained in the bearing seat 54, extension of the actuators 60 moves the conveyor 30 upwards in a linear manner. Conversely, with the bearing pin 52 retained in the bearing seat 54, extension of the actuators 60 pivots the discharge conveyor 30 downwardly, and when the bearing pin 52 is not retained in the bearing seat 54, retraction of the actuators 60 moves the conveyor 30 downwards in a linear manner.

In preferred embodiments, the bearing pin 52 is released from the bearing seat 54 when the discharge conveyor 30 is disposed at its steepest angle with respect to the longitudinal axis, which typically corresponds to the transport state. Hence, movement of the discharge conveyor 30 into and out of the access state is typically performed when the discharge conveyor 30 is disposed at its steepest angle with respect to the longitudinal axis.

In alternative embodiments (not illustrated) the conveyor 30 need not necessarily be a discharge conveyor and may alternatively be an in-feed conveyor that is configured to feed material to the main body of the apparatus.

In alternative embodiments (not illustrated), the conveyor 30 need not necessarily be pivotable about the transverse axis, i.e. it may operate with a fixed angle of inclination.

The invention is not limited to the embodiment(s) described herein but can be amended or modified without departing from the scope of the present invention.

The invention claimed is:

1. A material processing apparatus comprising:
   a body;
   a first conveyor having a first end and a second end;
   a coupling mechanism coupling said conveyor to said body with said first end being proximal to the body and said second end being distal to the body, said coupling mechanism being configurable to allow said first conveyor to pivot with respect to said body about a transverse axis, and being configurable to allow said first end of said first conveyor to be moved with respect to the body; and
   at least one actuator for moving said first conveyor with respect to said body, wherein said at least one actuator is operable to pivot said first conveyor about said transverse axis, and to move said first end of the first conveyor with respect to the body.

2. The apparatus of claim 1, wherein said coupling mechanism is configurable to allow said first end of said conveyor to be raised and lowered with respect to the body, and wherein said at least one actuator is operable to raise and lower said first end of the first conveyor with respect to the body.

3. The apparatus of claim 1, wherein said at least one actuator is operable to move said first conveyor into and out of an access state in which said first end adopts a relatively raised position with respect to said body.

4. The apparatus of claim 1, wherein said coupling mechanism is configurable to allow linear movement of said first conveyor with respect to said body.

5. The apparatus of any claim 1, wherein said body includes a second conveyor having first and second ends, and wherein, at least in a working state of said first conveyor, said second end of said second conveyor is located adjacent said first end of said first conveyor, and wherein said at least one actuator is operable to move said first end of said first conveyor away from said second end of said second conveyor.

6. The apparatus of claim 5, wherein said second conveyor is removable from said body, and wherein said at least one actuator is operable to move said first conveyor into and out of an access state in which said first end of said first conveyor does not obstruct removal of said second conveyor from said body.

7. The apparatus of claim 1, wherein said coupling mechanism comprises a pivotable coupling comprising at least one first coupling part provided on the first conveyor, and at least one corresponding second coupling part provided on the body of the apparatus, and wherein said pivotable coupling is configurable so that said first and second coupling parts are releasably engagable with each other.

8. The apparatus of claim 7, said first coupling part comprises a pin bearing and the second coupling part comprises a bearing seat for receiving the pin bearing, and wherein the bearing seat has an open mouth to allow the bearing pin to enter and leave the seat in a direction perpendicular to the pivot axis, said bearing seat optionally being U-shaped or hook shaped.

9. The apparatus of claim 8, wherein said bearing seat is oriented so that the mouth faces upwards.

10. The apparatus of claim 1, wherein said at least one actuator is coupled between said body and said first conveyor.

11. The apparatus of claim 1, wherein said at least one actuator comprises at least one linear actuator.

12. The apparatus of claim 11, wherein the, or each, linear actuator has a first end pivotably coupled to said body, and a second end pivotably coupled to said first conveyor, and wherein, optionally, said first end of said at least one linear actuator is coupled to said body at a location above the transverse axis about which said first conveyor is pivotable.

13. The apparatus of claim 1, wherein said at least one actuator is operable either to pivot said first conveyor about said transverse axis, or to move said first end of the conveyor with respect to the body depending on an angle of inclination of the first conveyor with respect to the body.

14. The apparatus of claim 13, wherein said at least one actuator is operable to pivot said first conveyor through a range of angles of inclination, and is operable to move said first end of the conveyor with respect to the body when said first conveyor is at a designated angle of inclination, preferably a steepest angle of inclination.

15. The apparatus of claim 1, wherein the or each actuator that effects the pivoting movement of the first conveyor, is the same actuator as the or each actuator that effects movement of said first end of the conveyor with respect to the body.

16. The apparatus of claim 1, wherein the coupling mechanism further includes guide means for facilitating linear movement of the first end of the first conveyor with respect to the body of the apparatus.

17. The apparatus of claim 16, wherein said guide means comprises a linear movement mechanism comprising a linear track and a corresponding runner for running along the track.

18. The apparatus of claim 17, wherein said coupling mechanism includes a retaining device operable between a retaining state in which the runner is retained on the track, and a non-retaining state in which the runner is not retained on the track.

19. The apparatus of claim 17, wherein said coupling mechanism comprises a pivotable coupling comprising at least one first coupling part provided on the first conveyor, and at least one corresponding second coupling part provided on the body of the apparatus, and wherein said pivotable coupling is configurable so that said first and second coupling parts are releasably engagable with each other, and wherein said coupling mechanism is configured so that, when the respective first and second coupling parts are engaged, the runner is either not on the track, or is removable from the track, to allow pivoting movement of the first conveyor.

20. The apparatus of claim 17, wherein the coupling mechanism is configured such that, when the first conveyor is at a designated angle of inclination, the runner is located on the track.

* * * * *